(12) United States Patent
Bide

(10) Patent No.: US 6,470,264 B2
(45) Date of Patent: Oct. 22, 2002

(54) PORTABLE INFORMATION-PROVIDING APPARATUS

(76) Inventor: Stephen Bide, Torvet 9, DK-6100 Haderslev (DK)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/424,945

(22) PCT Filed: Jun. 3, 1998

(86) PCT No.: PCT/GB98/01611

§ 371 (c)(1),
(2), (4) Date: May 19, 2000

(87) PCT Pub. No.: WO98/55833

PCT Pub. Date: Dec. 10, 1998

(65) Prior Publication Data

US 2002/0052684 A1 May 2, 2002

(30) Foreign Application Priority Data

Jun. 3, 1997 (GB) .............................................. 9711453
Jul. 29, 1997 (GB) .............................................. 9715998

(51) Int. Cl.⁷ ......................... G01C 21/28; G01C 21/30
(52) U.S. Cl. ..................... 701/207; 701/214; 701/216; 340/990; 340/992; 340/546
(58) Field of Search ............................... 701/200, 207, 701/208, 211, 212, 213, 214, 216, 217, 223; 340/988, 990, 991, 992, 993, 546; 455/575

(56) References Cited

U.S. PATENT DOCUMENTS

| | | | | |
|---|---|---|---|---|
| 5,025,261 A | * | 6/1991 | Ohta et al. | 342/357.09 |
| 5,470,233 A | | 11/1995 | Fruchterman et al. | 434/112 |
| 5,574,465 A | | 11/1996 | Okada | 342/352 |
| 5,815,741 A | * | 9/1998 | Okuyama et al. | 396/51 |

FOREIGN PATENT DOCUMENTS

| EP | 0 524 814 | 1/1993 |
|---|---|---|
| EP | 0 629 832 | 12/1994 |
| EP | WO 99/42946 | 8/1999 |
| EP | WO 99/42947 | 8/1999 |
| GB | 2 287 535 | 9/1995 |
| GB | 2 298 539 | 9/1996 |

* cited by examiner

Primary Examiner—Gertrude Arthur
(74) Attorney, Agent, or Firm—Marshall, Gerstein & Borun

(57) ABSTRACT

A portable information-providing apparatus comprising a position detector, a direction detector, a processor, a memory, and information output device. The position detector provides data of a use's position. The direction detector provides data of a direction as determined by the user. The processor operates to correlate said position and direction data with information of features in the user's surroundings as stored in the memory. The information output device provides the information to the user, the information being related to a feature in the user's surroundings generally along the direction determined by the user.

40 Claims, 2 Drawing Sheets

PORTABLE INFORMATION-PROVIDING APPARATUS

This application is a 371 of PCT/GB98/01611 dated Jun. 3, 1998.

BACKGROUND

The invention relates to a portable information providing apparatus for supplying a user with information of features in his surroundings dependent upon his position.

Such apparatus is known, but generally takes the form of navigation apparatus such as shown in UK patent application GB-A-2287535 and European patent application EP-A-0524814.

SUMMARY OF THE INVENTION

The present invention consists in a portable information-providing apparatus comprising a position detector which provides data of a user's position, a direction detector which provides data of a direction as determined by the user, a processor which operates to correlate said position and direction data with information of features in the user's surroundings as stored in a memory together with position information of the same, and information output means operative to provide said information to the user, said information being related to a feature in the user's surroundings generally along said direction determined by the user by simply pointing the apparatus in the selected direction towards the feature of interest.

The apparatus preferably includes target proximity indicator means to provide the user with a cue to assist direction selection or pointing in relation to a selected feature. This indicator means may provide visual, audible or tactile cues. In one example, the indicator means may comprise a visible light beam such as formed by a low-power laser that is directed by the user at a target feature and forms a light spot as a visual cue on the feature. In other examples, the indicator means may respond directly to direction data from the direction detector and provide a visual cue on a "magic eye" type indicator such as used in tuning radio receivers, or an audio cue such as produced by Geiger counters, metal detectors or "Star War" Jedi light swords. The user scans the surroundings with the apparatus to point in different directions, and variations in the cue from the indicator means helps guide this pointing activity towards the target feature.

The target proximity indicator preferably incorporates sensitivity control means that adjusts the directional sensitivity or lateral scan sensitivity of the apparatus dependent upon the distance of target features from the user. This makes the apparatus easier to use at different target ranges from a few meters to several kilometres. Furthermore, this sensitivity control can be provided in terms of both azimuth angle and angle of inclination if necessary.

The apparatus may preferably be eye-controlled. In particular, the direction of the user's eye can be detected by the direction detector. Eye-blinking can be monitored, an eye-blink indicating selection of a feature for information provision.

The information output means presents the selected information in any suitable form whether visual, audible or tactile.

The information output means presents the selected information in any suitable form whether visual, audible or tactile.

The direction detector preferably defines a three-dimensional direction vector, for example as determined by azimuthal bearing data and angle of inclination data.

The position detector preferably defines the user's position in three dimensional space, for example using radio positioning technology such as satellite radio transmissions and/or terrestrial radio transmissions.

BRIEF DESCRIPTION OF THE DRAWINGS

Preferred embodiments of the invention will now be described by way of example with reference to the accompanying drawings.

DESCRIPTION OF THE PREFERRED EMBODIMENTS

Figure 1:
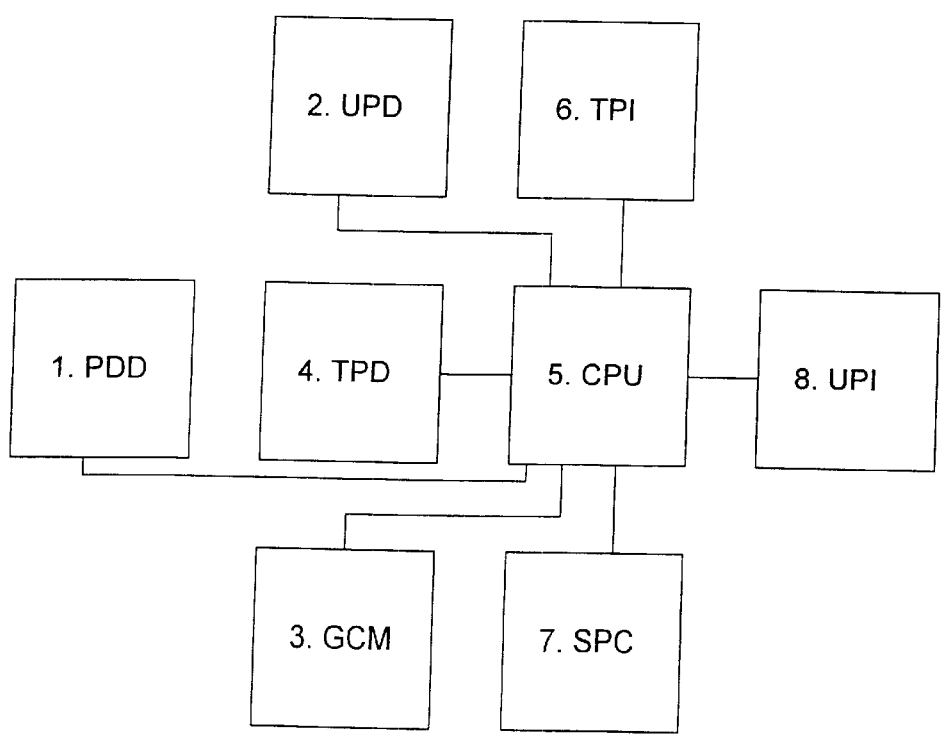
FIG. 1 shows a schematic illustration of a portable information-providing device constructed in accordance with the teachings of the present invention for supplying a user with information about features in the user's surroundings at which the device is pointed.

As shown schematically in FIG. 1, a portable information-providing device constructed in accordance with the teachings of the present invention comprises the following principle components:

1. A point direction detector (PDD) supplies real-time data defining a three-dimensional directional vector determined by the user's current point direction.
2. A user position detector (UPD) supplies real-time data defining a user's current physical position in three-dimensional space as an x,y,z co-ordinate set.
3. A global chronometer module (GCM) supplies accurate current and historical time & date information.
4. A target position database (TPD) is stored in a memory which holds feature information records (FIR) relating to a pre-defined spatially indexed target set.
5. A central processing unit (CPU) operates to correlate said user position, point direction, current time and target position data, to retrieve and present feature records—and generally to manage all aspects of apparatus operation, including data decryption and user subscription control.
6. A target proximity indicator (TPI) informs the use of the existence of targets on or close to the pointing direction path prior to their selection.
7. A search perspective control (SPC) progressively adjusts the lateral, radial and/or vertical sensitivity of the TPI as a function of distance from the user's location or the type of feature or the spacing of features or as a result of a linkage to the zoom and/or focus controls of an associated optical instrument or photographic apparatus.
8. A user presentation interface (UPI) supplies the feature information associated with a selected target to the user in a suitable form.

The Point Direction Detector (PDD) will typically, but not exclusively, employ a handheld electronic compass engine (ECE) or dead-reckoning module (DRM) for the detection of the earth's magnetic and gravitational fields to determine the three dimensional direction vector of the path in which the device is being pointed. Such ECE or DRM technology usually employs some form of magnetic sensor (eg. a magnetometer) providing azimuthal bearing data in degrees of arc together with some form of tilt sensor (eg. an accelerometer) providing angular tilt data in degrees of arc which can be combined by a suitable CPU to provide an accurate bearing in three dimensions. In other embodiments of the invention, the PDD could be built into a set of eye-glasses worn on the user's head with target bearings being determined by the attitude of the glasses themselves or by the actual direction of the user's gaze as determined by monitoring of his eye-movement.

The User Position Detector (UPD) will typically, but not exclusively, employ wireless technology for the reception of satellite or terrestrial radio transmissions to determine the user's current x,y,z spatial co-ordinates. Such transmissions can currently be derived from the US DoD Global Positioning System (GPS) satellites or the Russian GLONASS satellites and for greater accuracy may be combined with Differential GPS (dGPS) data transmissions provided by local FM/RDS, GSM, coast-guard or any other convenient source. The UPD may equally well derive its positional data from entirely different sources, for instance employing the Cambridge Positioning Systems (CPS) CURSOR concept or any other convenient positioning technology.

The Global Chronometer Module (GCM) will provide accurate time & date information. The apparatus can employ this data to determine the current status of those target features. or aspects of such features, which are dependent not only on position but also on certain times, dates and/or seasons, eg. the identification of heavenly bodies, shop or museum opening times, public transport availability etc. The GCM can also be used to re-construct the positions of features as they were at some given time in the past, or to predict their positions at some given time in the future.

The Target Position Database (TPD) is a pre-defined spatially-indexed digital encyclopedia of natural or man-made features stored in a structured repository and individually linked to an associated feature information record (FIR). Each feature is uniquely identifiable in terms of a) a position or position range in the form of a set or sets of x,y,z spatial co-ordinates. and b) a time or time range.

The Central Processing Unit (CPU) is any suitable on-board micro-processor or host micro-computer or combination of these employing any suitable System Architecture (SA) or Operating System (OS) which will satisfactorily link and co-ordinate the activities of all the component modules of the apparatus and enable them to inter-communicate and function together in unison. The user retrieves a given feature information record (FIR) by issuing an activate record command (ARC) to the CPU. This command will cause the CPU to present the user with the information record associated with the target closest to the PDD vector at the moment of issue which also fulfills or best matches all other required criteria. The ARC can be issued by any of several possible means, tactile, audible or visible. A typical tactile ARC implementation would involve pressing a button. A typical audible ARC implementation would involve issuing a verbal command. A typical visible ARC implementation would involve blinking of the eyes (eg. this could be advantageously combined with a glasses-based or headup-type PDD).

The Target Proximity Indicator (TPI) is designed to assist the user in the process of browsing his surroundings by supplying a user selectable range of visual, audible or tactile cues to help guide his pointing activity towards the pre-defined target locations. The visual cues may take the form of a visible light beam extending from the apparatus in the direction of pointing (eg. provided by a low-power laser) or of a local "magic-eye" indicator of a type similar to those employed by old-fashioned radio tuners to indicate station proximity. Such visual indicators may be supplemented (or replaced) either by a range of suitable sound cues (eg. a Geiger counter, a metal detector, a "Star Wars" Jedi lightsword etc.) or by tactile cues (eg. vibrations, jolts, heating & cooling sensations-etc.)

The Search Perspective Control (SPC) is designed as an adjunct to the TPI to aid the user's browsing activity by progressively adjusting the lateral, radial and/or vertical sensitivity of the TPI among other factors as a function of distance from the user. As the visible light beam mentioned above was designed to make explicit, the pointing activity of the apparatus can be conceived of as involving a "search beam", the notional path of which is used to identify targets. To make the device easier to use at different target ranges (ie. from a few metres to several kilometres) the angular spread of the beam path can be adjusted (manually and/or automatically) from a wide angle (eg. a maximum of 90°) for very close range use, to an extremely narrow one (eg. 0.01° or less) for long range use, a function conceptionally similar to the familiar "zooming" of a camera lens between wide-angle and tele-photo modes. This means that, despite a narrow angle of spread, the effective width of the beam—or lateral sensitivity of the TPI—at distances of several kilometres from the user will become quite large. The assumption is that the target groups being searched at great distances will tend to be widely spaced natural features, and that in this way the responsiveness of the TPI will remain intuitively appropriate over distance, corresponding in effect to our innate sense of visual perspective. In alternative embodiments, the sensitivity may be adjusted according to the actual spacing of features or the type of features observed. Where the apparatus is used to target extra-terrestrial features the lateral sensitivity adjustment can be augmented by a corresponding vertical one. In a similar fashion, the radial sensitivity of the beam can be constrained to a more or less narrow and moveable band somewhere along its projected path, a function conceptually similar to the focusing of a telescope or camera on objects at a given range.

The User Presentation Interface (UPI) supplies information associated with the selected feature to the user in any suitable form, visual, audible or tactile. A visual UPI would typically take the form of an LED, LCD, TFT or similar portable flat-screen display unit, but alternative embodiments might employ a head-up display in the form of special eye-glasses or a holographic projection. An audible UPI would most likely take the form of a loudspeaker, headphone or earpiece. A tactile UPI would probably be intended primarily for the use of the blind and/or deaf-blind, and most likely take the form of a Braille generating device (eg. gloves, foot-wear or body-pads). Any combination of the above is possible. In implementations where it is physically separate from the CPU, a given UPI module will be linked to the CPU by either cable or wireless means and employ any suitable technology including infra-red, radio or PAN (Personal Area Network)-type "body modems".

A device according to the invention does not need to employ a graphical user interface, or a graphical database (ie. a digital map). The feature information can be stored, processed and delivered to the user in plain text (natural language). Presentation can be implemented either on a visual display or, more conveniently and cost-effectively, via a headphone or earpiece as synthesised speech. This means that the device also requires correspondingly less processing capability, memory capacity and power supply, all of which are fundamental limiting factors restricting the rapid growth of comparable devices. Also, because the interface does not rely on graphical information, it is both more flexible with regards to its potential range of embodiments and user interfaces, and also much easier to operate, being in effect fully automatic. The apparatus is thus potentially both far more compact and robust in design, and much cheaper to manufacture and own than a comparable graphics-based device.

With regard to its flexibility, the device can be operated by either a) pointing the device or a part of the device at or towards a selected target and activating the device by clicking a button, b) looking at or towards a target and activating by blinking, or c) aligning some other predetermined part of the body to face the target and activating the device by any other pre-defined means.

Figure 2:
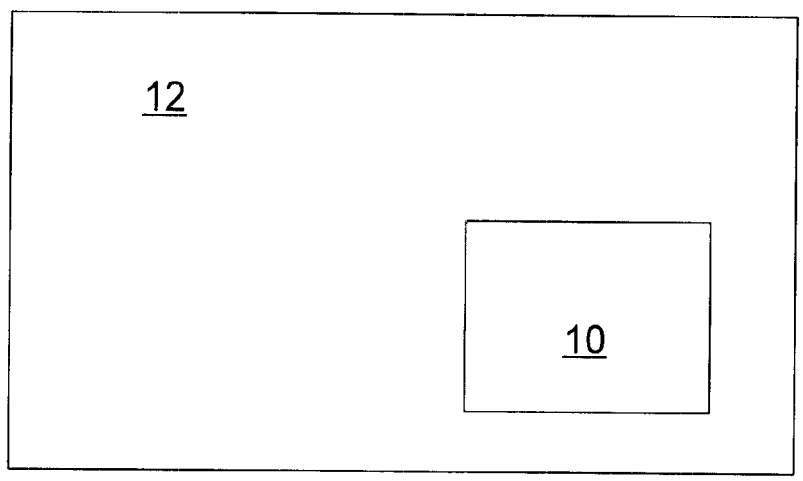
FIG. 2 shows a schematic illustration of an information-providing device incorporated into or combined with another apparatus or system.

The device can be handheld, carried about the person (e.g., in a bag, back-back, walking-stick or cane, pocket, belt, glove, hat or shoe), worn on the finger (like a ring), on the wrist (like a watch), on the head (like spectacles, headphones or earphones), in the ear (like a hearing-aid)—or any combination of these. The apparatus can also be fitted to an animal (e.g., a guide or rescue dog or dolphin) and can be used to inform either a human companion or the animal itself or both at once. As shown in FIG. 2, a device 10 such as that shown in FIG. 1 can also be combined with other apparatus or systems 12, such as:

a) portable electronics like mobile computers, telephones, pagers, watches, hearing-aids, dictaphones, radios & hi-fi equipment;
 b) portable optical and photographic instruments, either analogue or digital, like eye-glasses, binoculars, telescopes, sights, range finders, sextants, photographic cameras, film cameras and video cameras, and surveying instruments; and
 c) navigation systems and robot guidance systems.

Once a target is established, any data linked to it in the database can be supplied to the user in the form and sequence, and at the rate, that he wishes—or that is pre-defined by the specific application. The database can be provided on removable media, to increase application range. Equally well, the database can be enlarged enhanced or updated remotely by wireless data transfer (data broadcast). This last can advantageously be effected using the same carrier signal as that supplying the dGPS data or other positional information.

In the case of optical instruments a direct link could be established between the user's optical field of view—including the effects of panning, zooming focusing etc.—and the target search functions—in particular Search Perspective Control of the apparatus. The Target Proximity Indicator and other information related to the use of the apparatus could be conveniently displayed in the optical instrument's vision field, as is traditional with such photographic parameters like light intensity.

In the case of use with cameras and video cameras, in addition to supplying feature information to the user, the apparatus could use the same information to automatically title or caption the finished images or film sequences, or even to provide a fully synchronised commentary to the latter, which would be editable "off-line" along with the images.

A special embodiment of the apparatus could perform the above function entirely "off-line", during post-processing or viewing, on the basis of the camera position as detected by the User Position Detector (UPD), lens direction as detected by the Point Direction Detector (PDD) and field of vision parameters (eg. zoom and focus settings), captured with the images at the time of exposure.

The device is capable of providing information of the two following main varieties, corresponding to two main user-selectable modes of operation:

1. Natural Features
 a) Day-time: the name of a selected landscape feature or prominent landmark (eg. Mount Everest, Grand Canyon. Wookey Hole, etc.) followed by a description (eg. geographical, topological, geological, botanical, archaeological, historical, political. etc.)
 b) Night-time: the name of a selected natural heavenly body (ea. Moon. Great Bear Constellation, Haley's Comet, Venus, Pole Star) followed by a description (e,. astronomical, astrophysical, astrological, etc.)

2. Man-made Features
 a) Outdoors: the name of the feature or prominent structure (eg. Buckingham Palace, Houses of Parliament, Balls Pond Road, Wreck of the Titanic, etc.) followed by a description (eg. private residence, Victorian folly, ancient causeway, boating accident, etc.)

In the case of buildings, the device could supply the postal address, the name of the owner and/or occupier, their telephone number—and any other publicly available information relating to the property, such as its value, function, history and architectural characteristics.

b) Indoors: in a museum, art gallery, exhibition, warehouse, shopping, mall, hotel, railway station, airport—or any other public area—the identity of designated items followed by appropriate information.
 c) Mobile targets: for instance vehicles, trains, vessels, aircraft and spacecraft which—unlike static targets—would either have to exhibit extremely predictable behaviour (eg. trains and satellites) or themselves have to be equipped with a real-time position and identity transmitter—linked to a central database—which would in turn have to be accessible to the apparatus (eg. via a mobile phone data link).

Significantly, and with regard to both the above groups 1 and 2, if required to do so, the apparatus is also able to re-construct the positions of features as they were at some given time in the past or to predict their positions at some given time in the future.

This functionality may be of particular interest to tourists, historians, archaeologists & astronomers.

The device can potentially be employed for the guidance, orientation or general "edutainment" of many different user groups in a wide variety of circumstances:

Public services police, fire, ambulance, doctors, social-workers and others

Leisure pursuits tourist and sporting activities—town and country, land and sea

Delivery services postal, parcel, courier, taxis, Chinese takeaway . . . etc.

Retail outlets shops & restaurants etc. who could advertise goods and services

Special interest estate agents, developers, environmentalists, students . . .

Handicapped as an electronic "guide-dog" for blind and deaf-blind people

Children an educational toy, but could really be handy if they get lost

General public a hi-tech novelty—but also a genuinely useful orientation aid.

What is claimed is:

1. A portable information-providing apparatus comprising a position detector which provides data of a user's position; a direction detector which provides data of a direction as selected by the user by pointing the apparatus along a line towards a specific feature of interest within the user's general view; a processor which operates to correlate said position and direction data with a corresponding record of said specific feature of interest in a database containing multiple records associated with different features in the user's surroundings, each record comprising data of the position of the feature and user information about the feature; and an information output device operative to output the user information from the record of said specific feature of interest at which the user has pointed the apparatus.

2. A portable information-providing apparatus according to claim 1, in which the direction detector is separate from the position detector.

3. A portable information-providing apparatus according to claim 2, in which the direction detector defines a three-dimensional direction vector.

4. A portable information-providing apparatus according to claim 3, in which the vector is determined from azimuthal bearing data and angle of inclination data, the direction detector comprising an azimuthal bearing sensor and tilt sensor.

5. A portable information-providing apparatus according to claim 1, in which the direction detector comprises an electronic compass or dead-reckoning module.

6. A portable information-providing apparatus according to claim 1, in which the position detector defines the user's position in three dimensional space.

7. A portable information-providing apparatus according to claim 1, in which the position detector includes radio positioning apparatus operative to define the user's position.

8. A portable information-providing apparatus according to claim 7, in which the radio positioning apparatus receives satellite and/or terrestrial radio transmissions for positioning.

9. A portable information-providing apparatus according to claim 7, in which the position detector includes a GPS or a dGPS or a CPS CURSOR or a GLONASS receiver.

10. A portable information-providing apparatus according to claim 1, including a target proximity indicator to provide the user with a cue to assist direction selection or pointing in relation to a target feature.

11. A portable information-providing apparatus according to claim 10, in which the indicator provides visual, audible and/or tactile cue(s).

12. A portable information-providing apparatus according to claim 11, in which the indicator comprises a visible light beam that is directed by the user at a target feature and forms a light spot as a visual cue on the feature.

13. A portable information-providing apparatus according to claim 11, in which the indicator responds directly to direction data from the direction detector and provides a visual cue on a "magic eye" type indicator or an audio cue.

14. A portable information-providing apparatus according to claim 11, in which in use, the user scans the surroundings with the apparatus to point in different directions, and variations in the cue from the indicator helps guide this pointing activity towards the target feature.

15. A portable information-providing apparatus according to claim 10, in which the target proximity indicator incorporates a sensitivity controller that adjusts directional, lateral, radial or vertical sensitivity of the apparatus dependent upon the distance of target features from the user, the type of features, or spacing of features.

16. A portable information-providing apparatus according to claim 15, in which the sensitivity controller is operative to adjust the directional sensitivity in terms of both azimuth angle and angle of inclination.

17. A portable information providing apparatus according to claim 1, in which the information output device presents the selected information in any suitable form or forms whether visual, audible and/or tactile.

18. A portable information-providing apparatus according to claim 17, in which the information is provided in plain text or natural language.

19. A portable information-providing apparatus according to claim 17, in which the information output device comprises a Braille generating device for the use of the blind and/or deaf-blind.

20. A portable information-providing apparatus according to claim 17, in which the information output means is remote and receives information by radio or infra-red or PAN-type body-modem broadcast.

21. A portable information-providing apparatus according to claim 1, in which the processor operates to provide information to the information output device dependent on a command or commands signal from the user.

22. A portable information-providing apparatus according to claim 21, in which the user presses a button to send a command.

23. A portable information-providing apparatus according to claim 21, in which the apparatus comprises a monitor to monitor eye-blinking of the user and to send a command signal upon an eye-blink being detected.

24. A portable information-providing apparatus according to claim 1, in which the information stored in the memory is supplied on a removable medium.

25. A portable information-providing apparatus according to claim 1, in which the information stored in memory, is enlarged, enhanced or updated by received information broadcast from a remote station.

26. A portable information-providing apparatus according to claim 1, in which the information stored in the memory comprises information of natural features.

27. A portable information-providing apparatus according to claim 1, in which the information stored in the memory comprises information of man-made features.

28. A portable information-providing apparatus according to claim 1, in which the information stored in the memory comprises information of mobile features.

29. A portable information-providing apparatus according to claim 28, in which mobile features send information of their position and identification to a remote station which provides this information to the apparatus.

30. A portable information-providing apparatus according to claim 1, in which information is provided of a feature or features known to have been present at a predetermined time in the past or expected to be present at a predetermined time in the future.

31. A portable information-providing apparatus according to claim 1, further comprising timer means operative to provide timing data to the processor for selection of time-dependent information of features and/or information of features present at other than the present time.

32. A portable information-providing apparatus according to claim 31, in which timing data includes date data.

33. A portable information-providing apparatus according to claim 1, in which the direction of the user's line of sight is detected by the direction detector.

34. A portable information-providing apparatus according to claim 1, in which the direction detector is built into an optical apparatus through which the user views said feature.

35. A portable information-providing apparatus according to claim 34, in which the optical apparatus comprises eye-glasses, binoculars, a telescope, a sight, a sextant, a camera, or surveying equipment.

36. A portable information-providing apparatus according to claim 1, incorporated in portable electronic in the form of a mobile computer, a telephone, a pager, a watch, a hearing-aid, a dictaphone or hi-fi equipment.

37. A portable information-providing apparatus according to claim 1, fitted to an animal.

38. A portable information-providing apparatus according to claim 37, wherein the animal is a dog or a dolphin.

39. A portable information-providing apparatus according to claim 1, incorporated in a navigation system or robot guidance system.

40. A portable information-providing apparatus comprising:

- a position detector which provides user position data as determined by the user's position;
- a direction detector which provides pointing direction data as selected by the user by pointing the apparatus along a line toward a specific feature of interest within the user's surroundings;
- a database containing multiple records associated with a plurality of features in the user's surroundings, each record comprising feature position data and user information about each of the plurality of features;
- a processor which operates to correlate said user position data and pointing direction data with a record corresponding to said specific feature of interest in the database; and
- an information output device operative to output the user information from the record for said specific feature of interest at which the user has pointed the apparatus as a result of only pointing the apparatus.

* * * * *